United States Patent
Tripathi et al.

(10) Patent No.: US 6,862,268 B2
(45) Date of Patent: Mar. 1, 2005

(54) METHOD AND APPARATUS FOR MANAGING A CDMA SUPPLEMENTAL CHANNEL

(75) Inventors: Nishith D. Tripathi, Allen, TX (US); Farid T. Khafizov, Plano, TX (US); Venkata S. Alapati, Dallas, TX (US)

(73) Assignee: Nortel Networks, LTD (CA)

( * ) Notice: Subject to any disclaimer, the term of this patent is extended or adjusted under 35 U.S.C. 154(b) by 778 days.

(21) Appl. No.: 09/836,454

(22) Filed: Apr. 16, 2001

(65) Prior Publication Data

US 2002/0085521 A1 Jul. 4, 2002

Related U.S. Application Data

(63) Continuation-in-part of application No. 09/751,463, filed on Dec. 29, 2000, now abandoned.

(51) Int. Cl.[7] ........................... G01R 31/08; H04Q 7/00; H04L 12/28
(52) U.S. Cl. ....................... 370/252; 370/329; 370/335; 370/412
(58) Field of Search ................... 370/252, 335, 370/412, 431, 328, 329, 465, 232, 342; 455/464

(56) References Cited

U.S. PATENT DOCUMENTS

6,490,268 B1 * 12/2002 Lee et al. ................... 370/342
6,493,328 B2 * 12/2002 Fong et al. ................. 370/329
6,757,541 B2 * 6/2004 Achour et al. .............. 455/450

* cited by examiner

*Primary Examiner*—Duc Ho
(74) *Attorney, Agent, or Firm*—Gerlick Harrison & Markison; James A. Harrison; Bruce Garlick (57) ABSTRACT

A method and apparatus for implementing a supplemental channel in an IS-2000 CDMA network includes a system that determines when to initiate a supplemental channel transmission, when to terminate a supplemental channel transmission, the period or duration of a supplemental channel, and, finally, the data rate of the supplemental channel. In short, an implementation for a supplemental channel is provided that considers the power capacity of the BTS, the desire to minimize interference, the desire to maximize revenue and the number of users, and the desire to minimize the probability of blocking (a user being denied access).

12 Claims, 9 Drawing Sheets

METHOD AND APPARATUS FOR MANAGING A CDMA SUPPLEMENTAL CHANNEL

CROSS REFERENCE TO RELATED APPLICATIONS

This application is a continuation-in-part of and incorporates by reference application Ser. No. 09/751,463, filed on Dec. 29, 2000 now abandoned, said filed application having the same named inventors as the present application.

BACKGROUND

1. Technical Field

The present invention relates to wireless communication networks, and more particularly, a method and apparatus for managing a supplement data channel in a Code Division Multiple Access network.

2. Description of the Related Art

Wireless networks, and more particularly, Code Division Multiple Access (CDMA) networks are being modified in a manner consistent with standard IS-2000. One change that is defined in the IS-2000 standard for next generation CDMA networks is the addition of a supplemental channel. Heretofore, only a fundamental channel was used to transmit data in IS-95 systems. Now, however, a supplemental channel has been defined for transmitting large blocks of data on an as needed basis. In the past, IS-95 has been used for carrying voice traffic.

Next generation systems, however, are being designed to also carry data traffic. Accordingly, the IS-2000 CDMA standards define a supplemental channel that can carry in excess of 300 kilobits per second. In contrast, a traditional voice channel only carries 9.6 kilobits per second.

As CDMA is becoming the preferred platform for next generation systems, and more particularly, for transmitting large amounts of data over a wireless link, new system issues are being presented, or alternatively, are being presented in newer and more challenging ways. For example, power control has always been a key part of a system designed for a CDMA system. A goal in power control for CDMA systems is to minimize the power transmission level that is required to deliver data with a specified signal quality or error rate. For example, voice data is usually expected to be delivered with a 1% frame error rate. Thus, if the frame error rate is below 1%, the power transmission level is reduced. In contrast, if the received frame error rate exceeds 1%, then the power transmission level is increased.

Because CDMA systems all transmit at the same frequency, it is important to reduce the power transmission levels so as to minimize interference to other signals. Thus, by finding the minimum transmission level for each signal, the system capacity is maximized. An additional aspect about power control, however, which becomes especially prevalent in next generation systems, is that of power capacity by the base station transceiver system.

As supplemental channel transmissions occur, the transmission power that is required to be produced by the base station for delivering communication signals to potentially hundreds of mobile stations as well as supplemental channel transmissions to a much smaller number of mobile terminals or stations, may readily require the complete power capacity of the base station transceiver system (BTS). Thus, in addition to minimizing the interference to other signals, issues exist about how and when to admit calls requiring transmissions over the supplemental channel.

A system designer of a next generation CDMA system must not only account for these factors, but also the general desire by the service providers to maximize revenue and the number of users. Accordingly, technical tradeoffs that achieve technical goals but that also maximize revenue are desirable. What is needed, therefore, is a system design for implementing a supplemental channel in an IS-2000 CDMA network that addresses each of these aforementioned concerns.

SUMMARY OF THE INVENTION

A method and apparatus for implementing a supplemental channel in an IS-2000 CDMA network includes a system that determines when to initiate a supplemental channel transmission, when to terminate a supplemental channel transmission, the period or duration of a supplemental channel, and, finally, the data rate of the supplemental channel. In short, an implementation for a supplemental channel is provided that considers the power capacity of the BTS, the desire to minimize interference, the desire to maximize revenue and the number of users, and the desire to minimize the probability of blocking (a user being denied access).

A method and apparatus are provided that prompt a base station controller to evaluate whether a supplemental channel is needed, to assign a data rate, to design a supplemental channel period, and to determine when to release the supplemental channel resources for use for transmission to another mobile station.

In determining whether a supplemental channel is needed, the base station controller examines the amount of data and the data rate of data that is being received for transmission to the mobile station. In general, a threshold for determining whether a supplemental channel is needed is defined in terms of a quality of service. For example, one threshold that might trigger a request for a supplemental channel is that a given data packet will not be transmitted to the mobile station within 4 seconds of being received by the base station controller because of throughput issues on the fundamental channel.

In addition to determining whether a supplemental channel is needed, a base station controller assigns a data rate for the supplemental channel. Stated simply, the data rate that is assigned for the supplemental channel is one that accounts for the amount of data being transmitted by the fundamental channel, and more particularly, the excess amount that must be required by the supplemental channel. Because, in the described embodiments, the supplemental channels are transmitted at one of a plurality of specified transmission rates, a supplemental channel rate is selected that exceeds the excess data rate.

The base station controller also must assign a supplemental channel period, or lock time. Different embodiments may be implemented for assigning a lock time. In one embodiment, a lock time that maps to a given input data rate to a buffer is used. In another embodiment, the total amount of data is calculated at a given time that a supplemental channel decision is being made, and that amount of data is divided by the sum of the fundamental channel and selected supplemental channel data rates. The answer, which is in seconds in terms of units, then defines the lock time value. In a third embodiment of the invention, both of the two above calculations are performed. Then, the system selects according to specified criteria. In one embodiment, the larger of the two lock time values is selected by the base station controller.

Finally, the invention includes determining when to release the supplemental channel. The supplemental channel is always released when the lock time has expired. However, in an alternate embodiment of the invention, the supplemental channel also is released when the amount of data to be transmitted falls within the capacity of the fundamental channel while satisfying a 4 second quality of service parameter for data being transmitted over fundamental and supplemental channels.

BRIEF DESCRIPTION OF THE DRAWINGS

A better understanding of the present invention can be obtained when the following detailed description of the preferred embodiment is considered with the following drawings, in which.

DETAILED DESCRIPTION OF THE DRAWINGS

Figure 1:
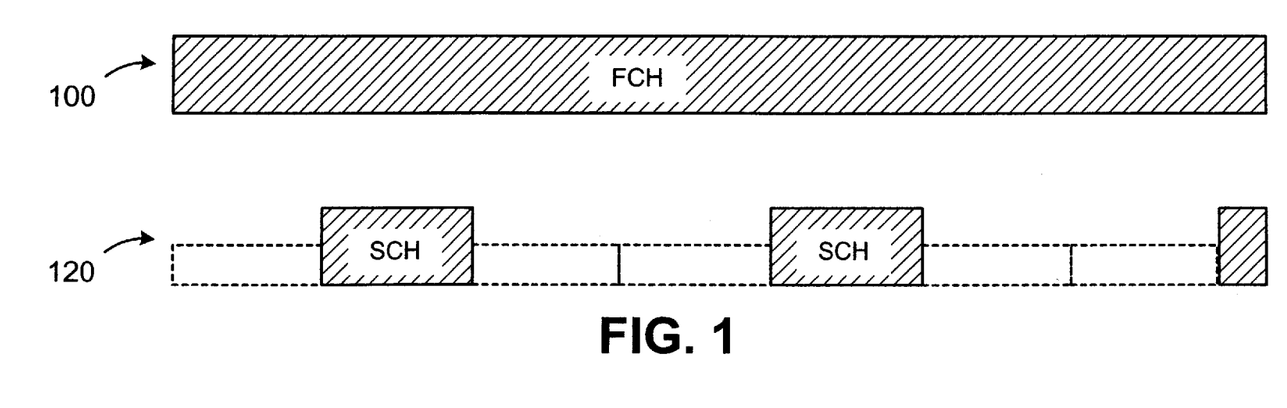
FIG. 1 is an illustration of signal transmissions occurring over a fundamental channel and a supplemental channel.

FIG. 1 is an illustration of signal transmissions occurring over a fundamental channel and a supplemental channel. As may be seen, a fundamental channel signal shown generally at 110, a fundamental channel is shown being transmitted having a continuous transmission pattern representing that the fundamental channel is used continuously for transmitting voice or data. In contrast, the supplemental channel transmissions shown generally at 120 are only transmitted on a periodic basis when specified conditions occur. Each of the shaded blocks represents the actual supplemental channel transmission while each of the smaller magnitude blocks represents setup (leading the SCH transmission) and tear down (following the SCH transmission) of the actual SCH transmission.

As will be explained in greater detail herein, the supplemental channel is utilized for transmitting voice or data signals whenever a specified amount of data has been queued in a radio link protocol (RLP) buffer. In the present embodiment of the invention, the supplemental channel is triggered or used whenever a given data packet within the RLP buffer will be in queue to be transmitted 4 or more seconds. As is known by those skilled in the art, the RLP buffer is a first in, first out buffer. Accordingly, when a data packet is received for transmission over a wireless communication link, the data packet is stored in the RLP buffer and is not transmitted until all data packets received before it was received are transmitted.

The fundamental channel transmissions, shown generally at 110, are formed to transmit data at a 9.6 kilobit per second data rate. In contrast to that, the supplemental channel of the described embodiment, as shown generally at 120, can transmit data at a plurality of data rates, according to selection, including 19.2 kilobits per second, 38.4 kilobits per second, 76.8 kilobits per second, or 153.6 kilobits per second. Also, while not explicitly shown, the period or duration of the supplemental channel is variable. Here, a period of the supplemental channel shall be referred to herein as the lock time. In one embodiment of the present invention, the setup and tear down times as represented by the smaller blocks preceding and following the SCH block are each about 300 milliseconds long. In the described example of FIG. 1, the lock time of the SCH also is 300 milliseconds.

Figure 2:
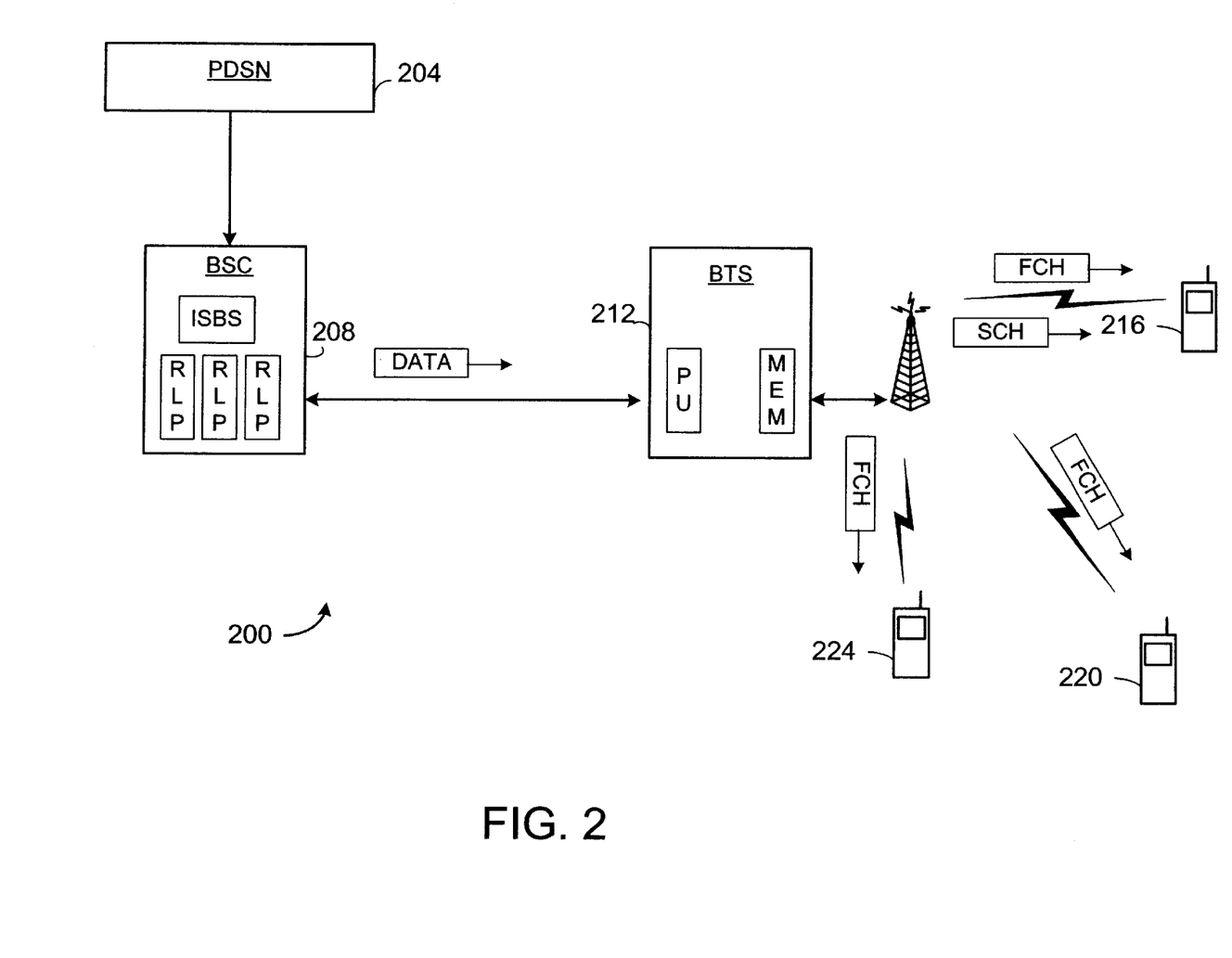
FIG. 2 is a functional block diagram illustrating a radio telephone network that requests and manages supplemental channel operation according to one embodiment of the present invention.

FIG. 2 is a functional block diagram illustrating a radio telephone network that requests and manages supplemental channel operation according to one embodiment of the present invention. Referring now to the radiotelephone network of FIG. 2, a packet data service node (PDSN) 204 is coupled to a base station controller (BSC) 208 for delivery of data thereto. The data that is transmitted to the BSC 208 is ultimately, for delivery to a mobile station. Thus, as may be seen, base station controller 208 is coupled to deliver the packet data to a base station transceiver system (BTS) 212. BTS 212 actually transmits the data to the mobile stations from a tower over the air interface.

In operation, PDSN 204 transmits a stream of data to BSC 208 for delivery to a particular mobile station, for example, mobile station 216. For exemplary purposes, assume that PDSN 204 also has data for delivery to mobile stations 220 and 224. As BSC 208 receives the data for each mobile station, it stores the data in a radio link protocol stack. The radio link protocol stack is a first in, first out buffer that is for buffering data that is received and to be delivered to a mobile station.

BSC 208 creates a radio link protocol stack for each mobile station 216, 220 and 224 that is in communication with the BTS. Thus, each RLP buffer or stack is receiving either voice or data for deliver to each of the mobile stations 216, 220 and 224. The BSC then transmits data to the BTS 212 for transmission to the mobile stations. The BSC transmits the data to the BTS at a data rate that the BTS can process without overflows or losing data. As discussed before, data is transmitted from the BTS at a rate of 9.6 kilobits per second on the fundamental channel. Thus, as may be seen, BTS 212 is transmitting three data streams over three fundamental channels to mobile stations 216, 220 and 224, respectively. Additionally, BTS 212 is transmitting one data stream over one supplemental channel to mobile station 216.

As each of the mobile stations is to receive its data with no more than a 4 second delay, BSC 208 and BTS 212 cannot transmit the data over the supplemental channel to mobile station 216 indefinitely because the BTS must its ability to transmit over a supplemental channel to deliver data to the other mobile stations requiring a supplemental channel to satisfy the four second delay requirement.

Because the resources are shared resources, the present inventive scheme must account for the 4 second requirement for each of the mobile stations. Accordingly, the invention herein includes the methodology and apparatus for sharing the resources, and more particularly, for transmitting supplemental channel data to each of the mobile stations requiring supplemental channel transmissions so as to not violate the 4 second requirement for data delivery. While the example of FIG. 2 illustrates the transmission of only one supplemental channel (to simplify the explanation), it is understood that a BTS may actually transmit over several supplemental channels. In general, the issues that limit the number of supplemental channels include the interference that is created by transmission over a supplemental channel in addition to transmission power capacity of the BTS itself. It also is understood that a given BTS communicates with a much greater number of mobile stations. Only three are shown in FIG. 2 for simplicity.

Figure 3A:
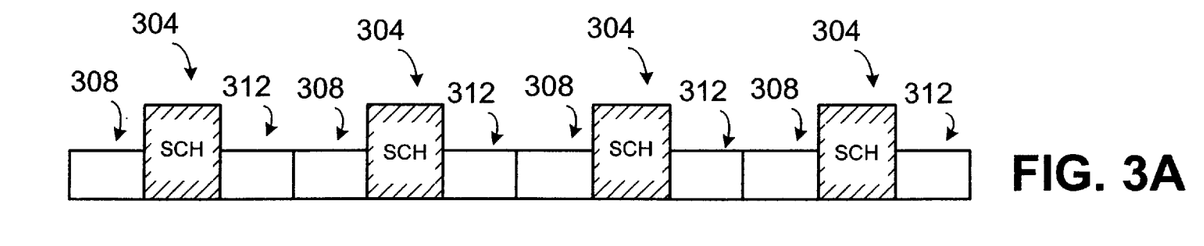
FIGS. 3a and 3b are signal diagrams illustrating the operation of a supplemental channel signal with respect to a base station controller.
Figure 3B:
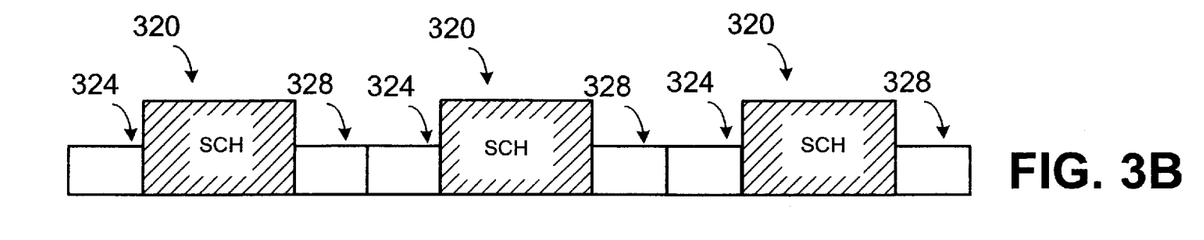

FIGS. 3a and 3b are signal diagrams illustrating the operation of a supplemental channel signal with respect to a base station controller. Referring now to FIG. 3a, a supplemental channel transmission occurs at each of the time frames shown generally at 304. As may be seen, each transmission period shown by block 304 is blanketed by a start period 308 and a tear down period 312. Start period 308 reflects an amount of time that elapses from the time that a base station controller issues signaling to generate new transmission of a supplemental channel to the time that the supplemental channel transmission actually occurs. The tear down period shown generally at 312 represents the amount of time that elapses from actual termination of transmission on the supplemental channel to the time that the base station controller receives signaling indicating the same.

A typical value for the start periods 308 and for the tear down periods 312 is 300 milliseconds. Thus, the transmission of each supplemental channel is blanketed by 300 millisecond guards from the start period 308 and the tear down period 312. Referring again to FIG. 3a, it may be seen that a total of 600 milliseconds elapses from the transmission of a first supplemental channel transmission to a second supplemental channel transmission. Thus, if the supplemental channel transmission lock time is 300 milliseconds, for example, then the supplemental channel is only transmitted for 1200 milliseconds during a total period of 3600 milliseconds as is shown in FIG. 3A. As may be seen, a total of 4 supplemental transmissions occurred in the timing diagram of FIG. 3A. Thus, if each supplemental channel transmission represented a transmission for a different user, the timing diagram of FIG. 3a illustrates that a total of 4 users may be accommodated in a 3600 millisecond time period.

Referring now to FIG. 3b, each of the supplemental channel transmissions shown generally at 320 has a lock time of 600 milliseconds. Again, each of the supplemental transmissions is blanketed by a start period 324 and a tear down period 328. As before, the start period 324 is 300 milliseconds long as is the tear down period 312. As may be seen from the timing diagram of FIG. 3b, the supplemental channel transmissions equal 1800 milliseconds out of a 3600-millisecond period. Thus, the timing diagram of FIG. 3b facilitated an additional 600 milliseconds of supplemental channel transmissions. Stated differently, the timing diagram of FIG. 3b realized a 50% increase in the supplemental channel transmission timing. On the other hand, only 3 supplemental channel transmissions occurred. Thus, the maximum number of users in the timing diagram of FIG. 3b is one less than that of FIG. 3a.

FIGS. 3a and 3b, therefore, illustrate some of the tradeoffs that result from varying the lock time of the supplemental channel transmissions. Shortening the lock time tends to increase the number of users while lengthening the lock time increases the amount of time that data may be transmitted over the supplemental channel while reducing the number of users. While it is desirable, on one hand, to maximize a number of users to maximize revenue, data requirements may force the use of the more efficient timing diagram of FIG. 3b in contrast to FIG. 3a.

Figure 4:
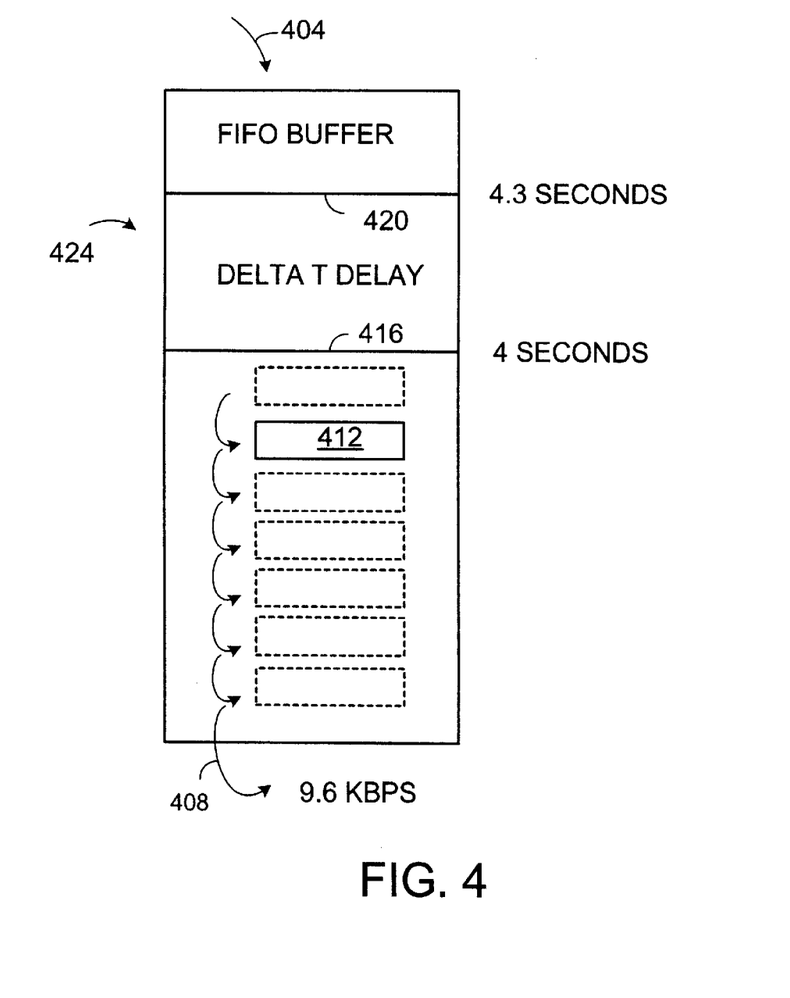
FIG. 4 is a functional block diagram showing the operation of a first in, first out radio link protocol buffer for storing data that is to be transmitted to a mobile station.

FIG. 4 is a functional block diagram showing the operation of a first in, first out (FIFO) radio link protocol buffer for storing data that is to be transmitted to a mobile station. As was described before, a general quality of service requirement is that a particular data packet not be stored within the radio link protocol buffer more than 4 seconds.

The radio link protocol (RLP) buffer 400 receives an input data stream 404 and produces an output data stream 408. The output data stream 408 is produced to a base station transceiver system for transmission to the mobile station. The data rate of data stream 408, therefore, depends on whether the BTS is transmitting the data using only a fundamental channel or a fundamental channel plus a supplemental channel. Thus, if only a fundamental channel is being used, the data stream rate of data stream 408 is 9.6 kilobits per second to match the throughput capacity rate of the fundamental channel.

As long as the input data rate of data stream 404 is equal to or less than 9.6 kilobits per second, only a fundamental channel is required for delivering data to the mobile station. If, on the other hand, the data stream 404 has a data rate that exceeds 9.6 kilobits per second, then the size of the RLP buffer will increase as the input exceeds the output rate.

The stored data within RLP buffer 400 is shown generally to include a data packet 412. Data packet 412 is received into the RLP buffer at input 404 and is output at 408. For exemplary purposes, all of the data of the RLP buffer of FIG. 4 is shown to be within a four second threshold 416. Once the buffer size exceeds threshold 416, however, a data packet 412 will not be output at output 408 within the four second threshold unless a supplemental channel is activated.

In the present design, whenever a location within the RLP buffer 400 is such that it will take 4 seconds or more for data packet 416 to progress to be transmitted on output data stream 408, a request is made for the activation of a supplemental channel for transmission of data to reduce the amount of data stored within the RLP buffer. As stated before, line 416 indicates a threshold point where data packets 412 below it can be transmitted over the fundamental channel within 4 seconds while data above it cannot be transmitted in less than 4 seconds without a supplemental channel. Thus, once a data packet 412 is received at input 404, whether it can be transmitted within four seconds depends upon whether its initial placement in the buffer is within the four second threshold represented by line 416.

Line 420 represents the amount of excess data that is expected to be achieved during the 300-millisecond supplemental channel setup delay that precedes every supplemental channel transmission. As may be seen, line 420 occurs at the 4.3 second mark (4 seconds plus 300 milliseconds). The amount of data referred as DELTA T DELAY is the amount of excess capacity data that is stored while only the fundamental channel is operating.

Continuing to refer to FIG. 4, from the time that the data amount reaches threshold 416, and a request is made for a supplemental channel, to the time that a supplemental channel is activated shown at 420 results in an additional amount of data, or block of data is shown generally at 424. If, by way of example, the start period is 300 milliseconds as it was in the example of FIGS. 3a and 3b, then the amount of data within block 424 is equal to the amount of data received by data stream 404 minus the amount of data transmitted in data stream 408 for a total period of 300 milliseconds.

Figure 5:
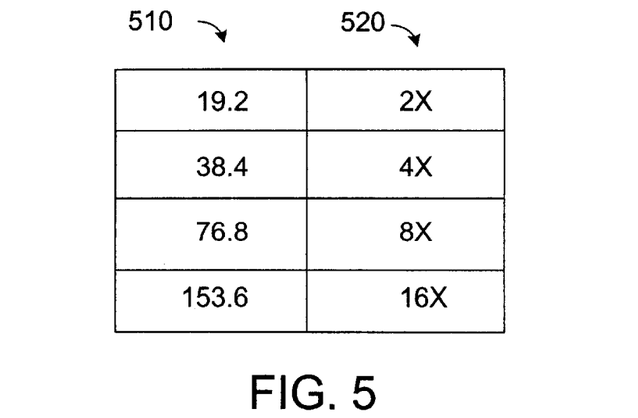
FIG. 5 is a table illustrating the relationship between the fundamental channel and the supplemental channel in terms of data rates.

FIG. 5 is a table illustrating the relationship between the fundamental channel and the supplemental channel in terms of data rates in one embodiment of the present invention. Referring now to FIG. 5, a fundamental channel transmits at a data rate of 9.6 kilobits per second. The supplemental channel data rates as shown in column 510 of FIG. 5 are 19.2 kilobits per second, 38.4 kilobits per second, 76.8 kilobits per second and 153.6 kilobits per second. As shown in column 520, these data rates are 2 times, 4 times, 8 times, and 16 times faster than the data rate for the fundamental channel. These particular data rates are those implemented in one embodiment of the present invention. It is understood, of course, that the data rates may be varied and may include other data rates as well. By way of example, the supplemental channel may also be formed to transmit data at the same rate as the fundamental channel, namely 9.6 kilobits per second. Alternatively, it may also be formed to carry data at a rate of 307.2 kilobits per second, which rate is 32 times faster than the fundamental channel.

Figure 6:
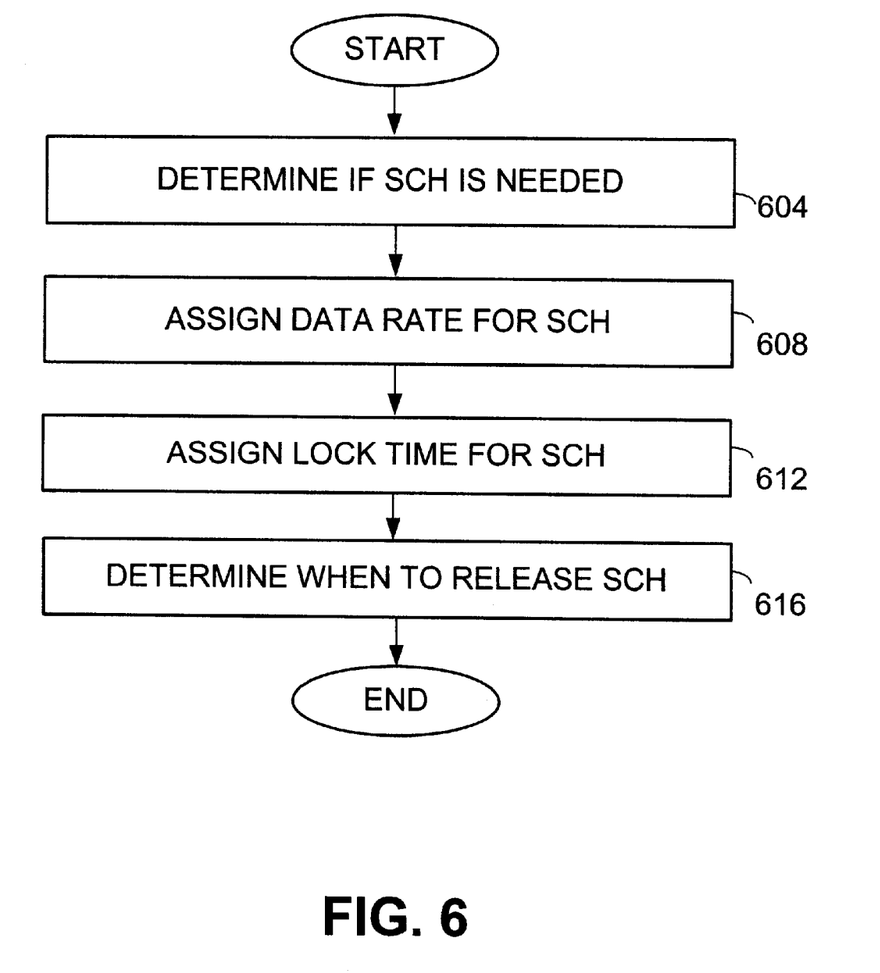
FIG. 6 is a flow chart illustrating a method for transmitting data over a supplemental channel in a CDMA network.

FIG. 6 is a flow chart illustrating a method for transmitting data over a supplemental channel in a CDMA network. Initially, a base station controller must determine whether a supplemental channel is needed (Step 604). As stated before, the supplemental channel is needed whenever the amount of data in a radio link protocol buffer exceeds an amount that a fundamental channel may transmit. In one embodiment of the present invention, that amount of data is equal to the amount of data that may be transmitted in a 4 second period at a 9.6 kilobit per second transmission rate. More specifically, that amount of data that triggers a request for a supplemental channel in the present invention is equal to 38.4 kilobits. Once that amount of data has been reached, the invention includes assigning a data rate for the supplemental channel (step 608). As shown in FIG. 5, in one embodiment of the present invention, the four supplemental channel data rates that can be assigned include 19.2 kilobits per second, 38.4 kilobits per second, 76.8 kilobits per second, and 153.6 kilobits per second.

Once a data rate has been assigned for the supplemental channel, a lock time is assigned for the supplemental channel (step 612). As described before, the lock time is the amount of time that a supplemental channel transmission occurs for a specified mobile station. As there is a general desire to maximize the number of users of supplemental channels to maximize revenue, the supplemental channel lock time will generally be short, rather than indefinite. The final step in the present invention for transmitting over a supplemental channel includes determining when to release the supplemental channel (step 616). For example, the supplemental channel is released when the lock time has expired. It can also be released under other circumstances. For example, it can be released whenever the BSC determines that enough data has been transmitted on the Supplemental channel that the four second threshold can be satisfied by only transmitting data on the fundamental channel. Whatever logic is implemented for releasing the supplemental channel, however, the final step does include releasing the supplemental channel for use for the same or another mobile station.

Figure 7:
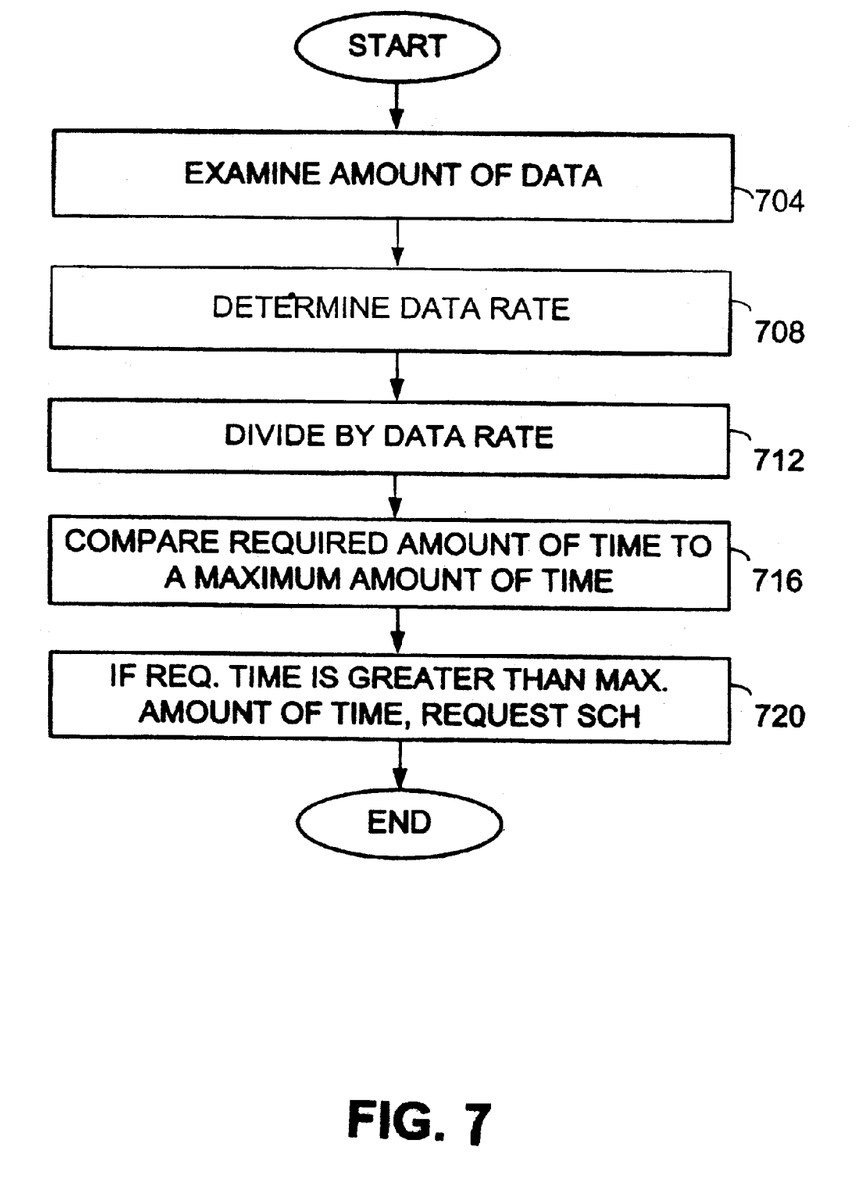
FIG. 7 is a flow chart illustrating a method for determining whether a supplemental channel should be requested.

FIG. 7 is a flow chart illustrating a method for determining whether a supplemental channel should be requested. The method for determining whether a supplemental channel is needed includes initially examining an amount of data stored within a buffer, by way of example, a radio link protocol buffer (step 704). Thereafter, the transmission data rate for the data being transmitted from the RLP buffer is determined (step 708). While the present invention contemplates an implementation wherein the data of the fundamental channels (and therefore the RLP output data rate) is 9.6 kbps, the output data rates may change due other factors as well. Thus, the invention includes either calculating the output data rate or, at least determining what the stated output data rate is for RLP buffer for transmissions from the fundamental channel. Typically, the output data rate will be a constant amount for a fundamental channel. Accordingly, in one embodiment, determining the output data rate is merely a matter of performing a look up for a stored value. Alternatively, however, because of network conditions, the output data rate may be less than ideal.

Once the output data rate is known, then the amount of data that presently exists in the RLP buffer is divided by the output data rate to yield the time required for a given data packet to be transmitted from the RLP buffer (step 712). Once the time required is calculated for the packet at the top of the stack of data packets that are to be transmitted, the amount of time that the given packet must wait is compared to a maximum value (step 716). For example, the maximum value in one embodiment of the present invention is 4 seconds. If the required amount of time to transmit the given data packet exceeds the threshold or maximum value of time, as determined from the comparison step of 716, then a supplemental channel request is made (step 720).

In an alternative embodiment of the present invention, the BSC merely examines an amount of data and determines whether a supplemental channel should be requested based upon the amount of data within the RLP buffer. This approach implicitly assumes an output data rate (e.g., 9.6 kbps) and that the output data rate will remain constant.

Figure 8:
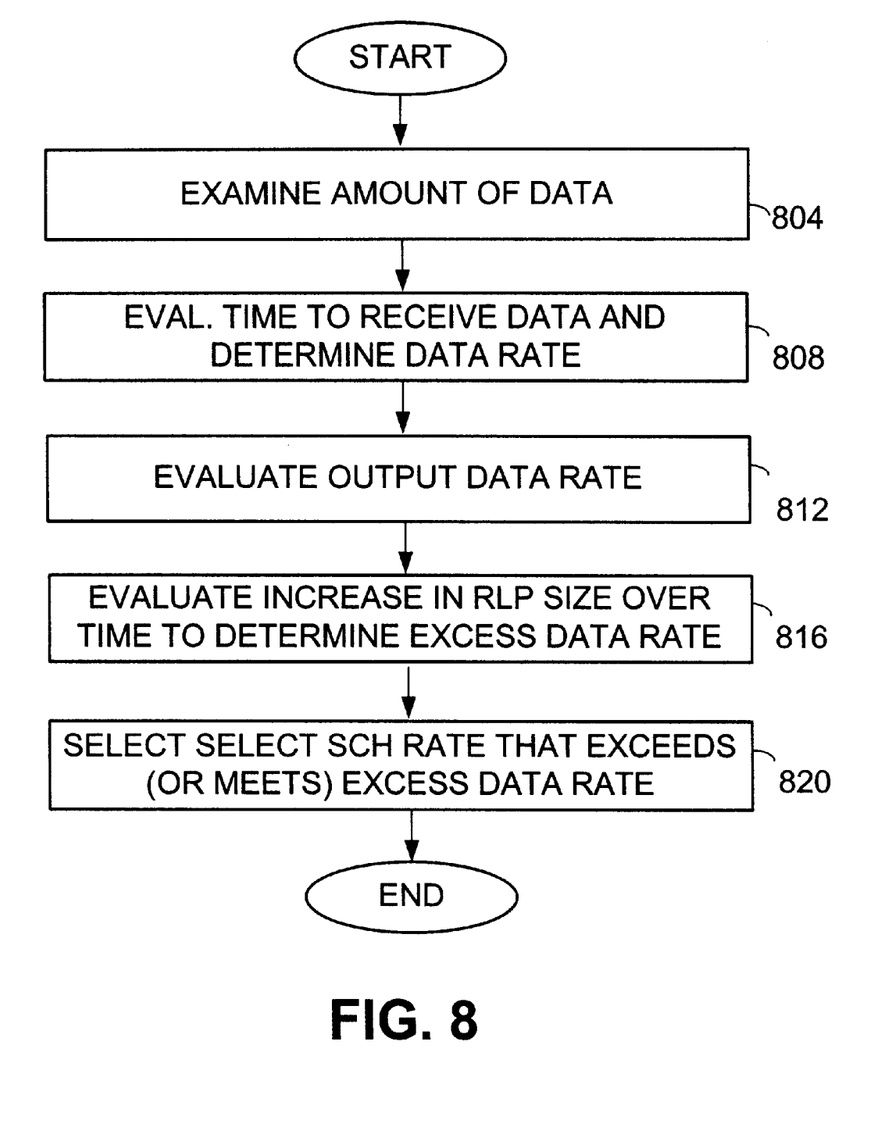
FIG. 8 is a flow chart illustrating a method for determining a data rate for the supplemental channel.

FIG. 8 is a flow chart illustrating a method for determining a data rate for the supplemental channel. The method of assigning a data rate for the supplemental channel includes evaluating an amount of data (step 804) and the amount of time that was required to receive that data (step 808). Thereafter, the amount of data is divided by the amount of time required to receive the data to calculate a data rate (step 812). Thereafter, the method includes determining the rate at which the data is being received in excess of the output rate (step 816). This determination, in one embodiment of the present invention, includes subtracting the output data rate from the input data rate. As was discussed before, the amount that is subtracted could be a constant value, such as the ideal output transmission rate over the fundamental channel, or it may be a calculated amount to account for actual system performance.

Once the excess data rate is calculated in step 816, then one of a specified group of supplemental channel data rates is selected (step 820). In one embodiment of the present invention, the slowest rate of the specified group of rates that exceeds the excess data rate is selected for a supplemental channel transmission rate (step 820).

Figure 9:
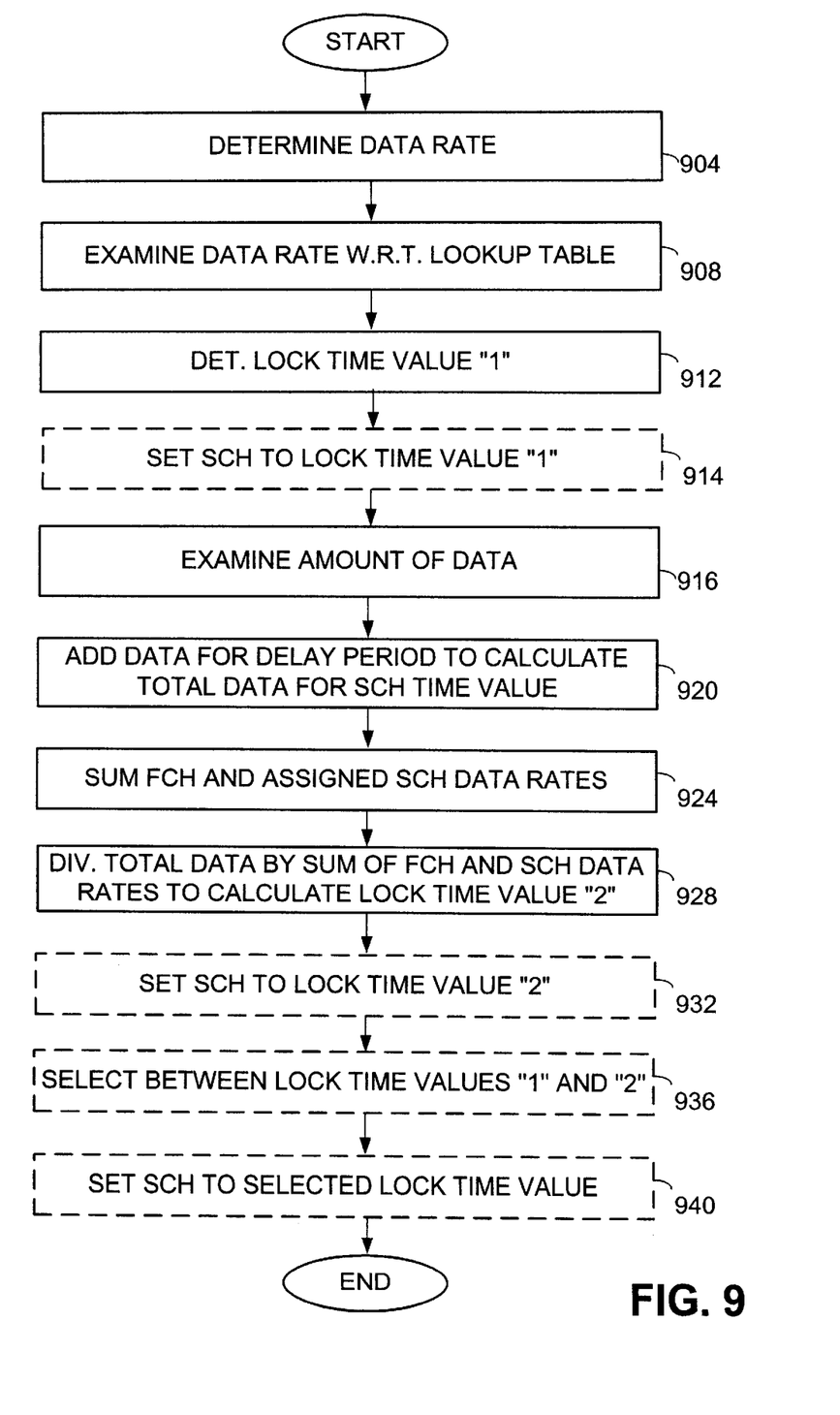
FIG. 9 is a flow chart illustrating a method for determining and assigning a lock time value for a supplemental channel.

FIG. 9 is a flow chart illustrating a method for determining and assigning a lock time value for a supplemental channel. Initially, the base station controller must determine the input data rate at which data is being received into the radio link protocol buffer (step 904). In one embodiment of the present invention, the data rate is calculated by examining an amount of data and an amount of time required to receive that data. Thereafter, the base station controller uses the data rate to find a corresponding lock time value in a lookup table (step 908). The corresponding lock time value is then the first determined lock time value, i.e., lock time value "1" (step 912). In one embodiment of the present invention, simulation results are used to create a table that correlates input data rates to preferred lock time values for the supplemental channel. Accordingly, the simulation results are stored in a table and are used by the base station controller to determine a lock time value. One embodiment of the invention includes setting the supplemental channel lock time value to lock time value "1" (step 912). Step 912 is shown as an optional step because, as will be explained, other approaches for setting the lock time value may be used.

In an alternate embodiment of the invention, a method for determining a lock time value includes examining an amount of data in the radio link protocol buffer (step 916), adding an amount of data received during the startup delay period to the amount of data already stored in the radio link protocol buffer to calculate a total data amount at the time that a supplemental channel would be activated (step 920). The alternate method then includes adding the fundamental channel output data rate along with the supplemental channel data rate to get a total output data rate (step 924). Thereafter, the total amount of data is divided by the total data rate to obtain a second lock time value, namely, lock time value "2" (step 928). Thereafter, the supplemental channel lock time value is optionally set to be calculated lock time value (step 932).

Yet another embodiment of the present invention includes calculating a lock time value "1" as illustrated in steps 904 thru 912 and a lock time value "2" as illustrated in steps 916 thru 932 to determine the longer of the two calculated lock time values (step 936). Thereafter, the longer lock time value of the two lock time values is optionally set as the supplemental channel lock time value (step 940).

As may be seen from the example of FIG. 9, the lock time value may merely reflect a lookup value from a table. Alternatively, the lock time value can be a calculated amount. Finally, the lock time value could be the greater (or lesser according to system design) of the lookup value and the calculated value.

Figure 10:
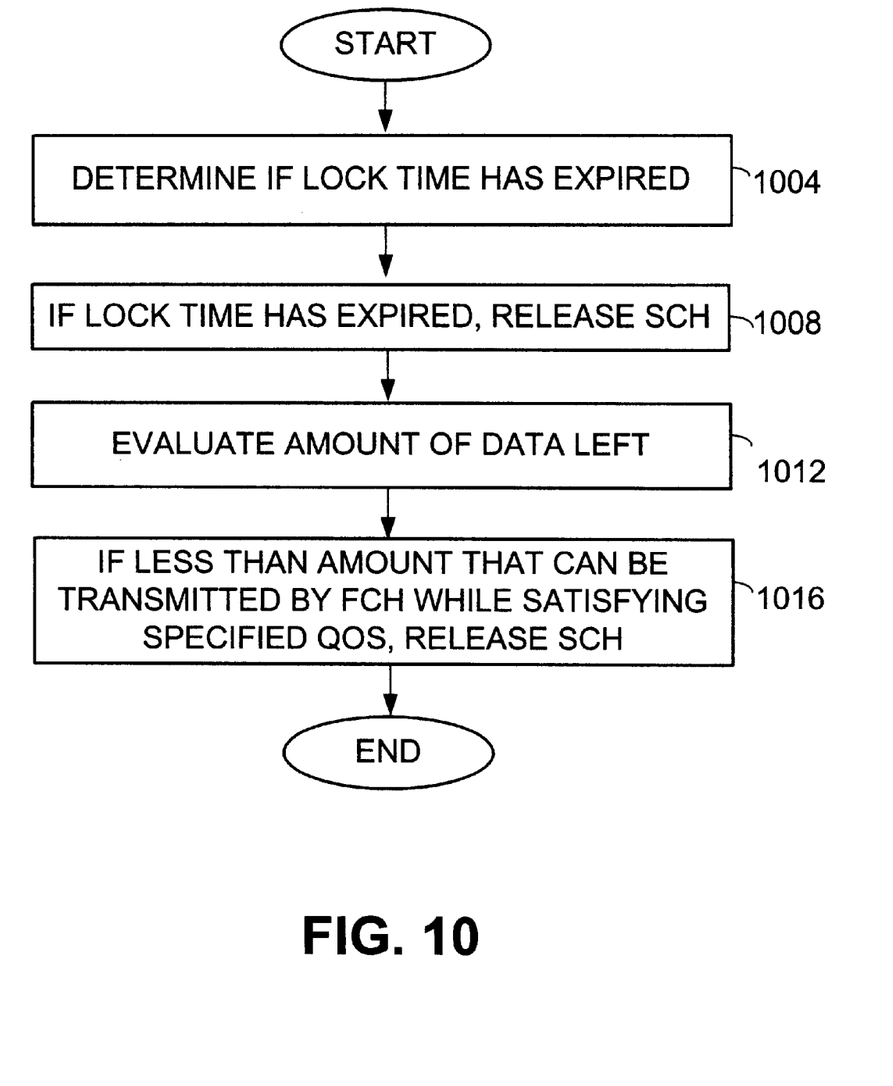
FIG. 10 is a flow chart illustrating a method for determining when to release a supplemental channel according to one embodiment of the present invention.

FIG. 10 is a flow chart illustrating a method for determining when to release a supplemental channel according to one embodiment of the present invention. Initially, the base station controller determines whether the lock time value selected for the supplemental channel has expired (step 1004). If so, the supplemental channel is released (step 1008). If not, the supplemental channel evaluates the amount of data remaining in the radio link protocol buffer and divides that by a fundamental channel output rate to determine if the defined quality of service standard time delay can be satisfied by use of the fundamental channel only (step 1012). For example, if the supplemental channel has reduced the amount of data to be less than 38.4 kilobits, then a fundamental channel transmitting data at a 9.6 kilobit per second rate would be able to output all of the remaining data within 4 seconds. Accordingly, if the data remaining in the radio link protocol buffer can be transmitted within 4 seconds, the supplemental channel is released for use for another mobile station (step 1016).

Figure 11:
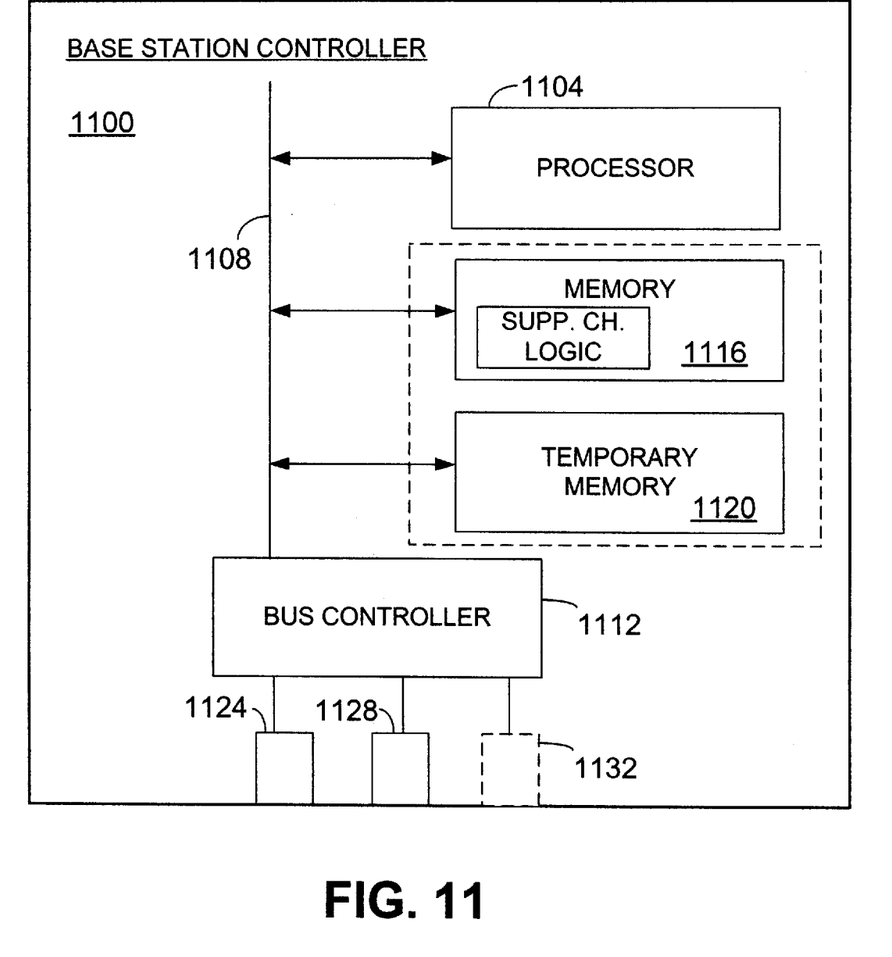
FIG. 11 is a functional block diagram of a base station controller according to one embodiment of the present invention.

FIG. 11 is a functional block diagram of a base station controller according to one embodiment of the present invention. Referring now to FIG. 11, a base station controller includes a processor 1104 that is coupled to communicate over a bus 1108 that is controlled by a bus controller 1112. Additionally, a memory 1116 is coupled to communicate over bus 1108. Memory 1116 includes computer instructions that define the operational logic of the base station controller. In particular, memory 1116 includes computer instructions that define the operational logic for determining whether to request a supplemental channel, to determine a data rate for the supplemental channel, to determine a lock time value for the supplemental channel, and to determine the supplemental channel release logic. In addition, base station controller 1100 includes a plurality of network ports 1124, 1128 and 1132 coupled to bus controller 1112.

A temporary memory 1120 used to create the radio link protocol buffers also is coupled to bus 1108. For example, network port 1124 is coupled to receive data that is to be transmitted to a mobile station. Accordingly, the computer instructions within memory 1116, when executed by processor 1104, prompt the bus controller 1112 to receive the data at input port 1124 and to store the data in the radio link protocol buffers 1120. A network port 1128, on the other hand, is used to output the data from the radio link protocol buffers. Accordingly, processor 1104 executes the computer instructions within memory 1116 to output data from output port 1128 at a data rate that is consistent with whether a fundamental channel or a fundamental channel and a supplemental channel are being used to transmit data to the mobile station.

In an alternate embodiment of the invention, the base station controller includes a second output port 1132 wherein output port 1128 is for transmitting data for transmission over the fundamental channel while output port 1132 is for output of data that is to be transmitted on the supplemental channel.

The computer instructions stored within memory 1116 define the operational logic of the base station controller with respect to the setup, use and release of the supplemental channel in a manner consistent with the methods illustrated herein. Also, it is understood that while FIG. 11 shows a traditional system that includes a processor, memory and an internal bus, the design may also be implemented in hardware with the use of hardware based state machines and logic circuitry. Such an implementation, that includes the operational logic defined herein by the description of the various methods, is included as a part of the present invention.

While the invention is susceptible to various modifications and alternative forms, specific embodiments thereof have been shown by way of example in the drawings and detailed description. It should be understood, however, that the drawings and detailed description thereto are not intended to limit the invention to the particular form disclosed, but on the contrary, the invention is to cover all modifications, equivalents and alternatives falling within the spirit and scope of the present invention as defined by the claims. As may be seen, the described embodiments may be modified in many different ways without departing from the scope or teachings of the invention. For example, the inventive concepts may be implemented in any code division multiple access network and is not limited to IS-2000 based networks.

What is claimed is:

1. A method for transmitting data from a base station transceiver station to a mobile station, comprising:
   transmitting data on a fundamental channel;
   determining whether transmission on a supplemental channel is necessary;
   if so, assigning a supplemental channel data rate;
   assigning a supplemental channel, wherein a lock time value for the supplemental channel is the greater of a lockup value that corresponds to the data rate and a calculated value wherein the calculated value is determined by dividing a total amount of data within a buffer by a total output data rate that accounts for use of the fundamental channel and the supplemental channel at the assigned supplemental channel rate lock time value; and
   transmitting data on the supplemental channel.

2. The method of claim 1, wherein the step of determining whether a supplemental channel is necessary includes evaluating an amount of data stored within a buffer.

3. The method of claim 2, wherein the amount of data is equal to 38.4 kilobits.

4. The method of claim 1, wherein the fundamental channel transmits data at a rate of 9.6 kilobits per second.

5. The method of claim 1, wherein the step of assigning a supplemental channel data rate includes determining a difference between the rate at which data is being received and a rate at which data is being transmitted from a buffer.

6. The method of claim 5, wherein one of a specified group of supplemental channel rates is selected, wherein the one rate that is selected is the lowest rate that exceeds the difference between the rate at which the data is being received and the at which the data is being transmitted on only the fundamental channel.

7. The method of claim 1, wherein a lock time value for the supplemental channel is assigned according to a rate at which the data is being received.

8. The method of claim 1, wherein a supplemental channel lock time value is assigned according to the amount of time required to transmit the present amount of data stored within a buffer when the fundamental channel and the supplemental channel at the specified rate are used to output data.

9. The method of claim 1, further comprising the step of determining whether to release the supplemental channel for use for another mobile station.

10. The method of claim 9, wherein the base station controller determines to release the supplemental channel if the assigned lock time value has expired.

11. The method of claim 10, wherein the base station controller determines to release the supplemental channel if the remaining amount of data within a buffer can be transmitted solely by the fundamental channel within a specified period of time.

12. The method of claim 11, wherein the specified period of time is 4 seconds.

* * * * *